B. A. AMBLE.
THRESHING MACHINE.
APPLICATION FILED OCT. 4, 1909.
949,049.
Patented Feb. 15, 1910.
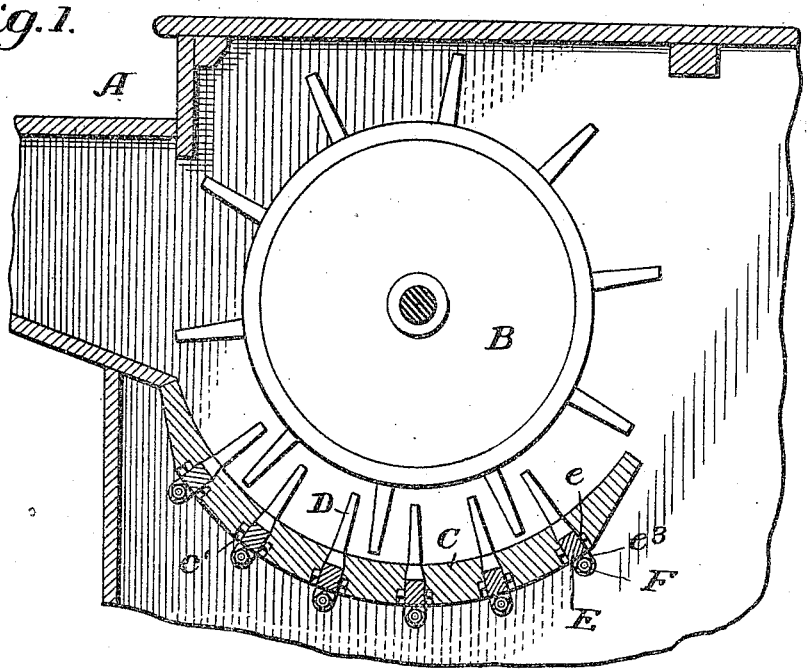
Fig. 1.
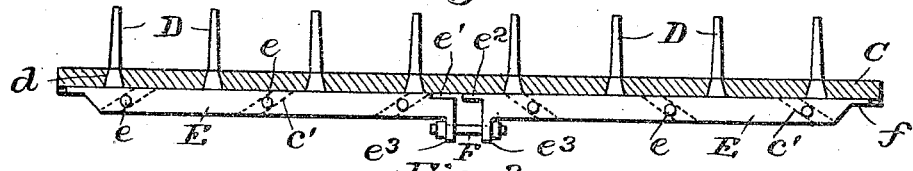
Fig. 2.
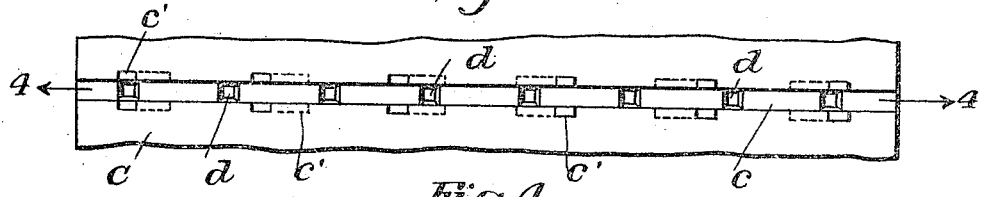
Fig. 3.
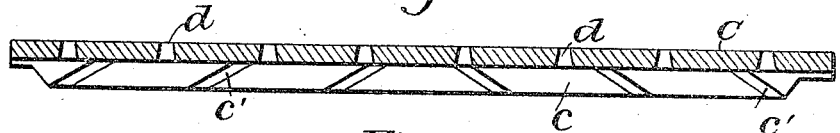
Fig. 4.
Fig. 5.
Witnesses
Inventor
Ben A. Amble
by his Attorneys

UNITED STATES PATENT OFFICE.

BEN A. AMBLE, OF GRAND FORKS, NORTH DAKOTA.

THRESHING-MACHINE.

949,049. Specification of Letters Patent. Patented Feb. 15, 1910.

Application filed October 4, 1909. Serial No. 520,769.

*To all whom it may concern:*

Be it known that I, BEN A. AMBLE, a citizen of the United States, residing in Grand Forks, in the county of Grand Forks and State of North Dakota, have invented certain new and useful Threshing-Machines, of which the following is a specification.

The object of my invention is to provide improved means for attaching teeth to the concaves of threshing machines.

Heretofore these teeth have usually been separately secured to the concave as by means of nuts engaging threaded shanks on the teeth, but by my improvements the teeth are passed through the concaves from the outside and are held in place by locking bars which hold a plurality of teeth in position and which can be readily inserted and withdrawn.

In the accompanying drawings, Figure 1 is a detail view in section of part of a threshing machine with my improvements applied. Fig. 2 is a detail view illustrating how the teeth are mounted in the concave and how they are held in place by the locking bars. Fig. 3 is a plan view of a portion of the underside of the concave with the teeth and locking bars withdrawn. Fig. 4 shows a section on the line 4—4 of Fig. 3.
Fig. 5 is a perspective view of one of the locking bars.

My improvements may be applied to threshing machines of various constructions.

In Fig. 1 A indicates a portion of the frame of a threshing machine, B the cylinder and C the concave. The teeth D are arranged in any suitable way in the concave. As shown the teeth have tapered lower ends or heads which extend into tapered recesses $d$ in the concave C. In this way the inward movement of the teeth is limited and they are securely held in place against lateral and longitudinal movement. In order to hold the teeth in their sockets, I provide locking bars E. Preferably two such bars are employed for each row of teeth, one of them having an arm $e^2$ and the other a recess $e'$ which is adapted to receive the arm $e^2$. Each locking bar in each pair is formed with a lug $e^3$ at its inner end and these are joined by a bolt F. By means of the bolt or the nut of the bolt, the locking bars may be drawn toward each other. The ends of the bars may be tapered, as indicated at $f$.

Each locking bar is provided with laterally projecting pins $e$, and each bar is adapted to enter a groove $c$ in the underside of the concave. Recesses $c'$ formed on the underside of the concave are arranged on opposite sides of the grooves $c$, and these recesses $c'$ are inclined, as shown, from their outer ends inwardly to receive the pins $e$ of the locking bars E. These recesses are so inclined that when the locking bars in each pair are drawn together they are also forced upwardly against the lower ends of the teeth D and force them into their sockets and also hold them firmly in place.

It will be understood that in assembling the parts the teeth D are first placed in position and then the bars E are placed in the grooves $c$ with the pins $e$ at the outer ends of the recesses $c'$, then the locking bars are pressed upward and toward each other causing the pins $e$ to move along the recesses $c'$.
By tightening the bolts F the locking bars are held firmly in position, being held there by the pins $e$ which cannot leave the recesses $c'$ and thus the teeth are securely held. By removing the bolts F the locking bars may be separated and withdrawn and any one or any desired number of teeth may be quickly removed and replaced.

The concave C forms a support for the teeth. My improvements may be applied to threshing machine cylinders and to other teeth supports.

I claim as my invention:

1. The combination of a concave, having a series of parallel grooves, teeth mounted in the concave in line with the grooves and extending through the concave, locking bars arranged in said grooves and engaging the ends of the teeth, means for holding the bars in place, and means for drawing the bars toward each other and simultaneously forcing them against the ends of the teeth.

2. The combination of a threshing machine concave, having grooves on its under side in line with the teeth, and recesses joining the grooves which are downwardly inclined from the under side of the concave, locking bars arranged in said grooves, pins on the bars entering the recesses, teeth extending through the concave and having their outer ends engaged by the locking bars, and means for drawing the bars toward each other and for simultaneously forcing them against the teeth to move said teeth inwardly.

In testimony whereof, I have hereunto subscribed my name.

BEN A. AMBLE.

Witnesses:
   CHAS. C. McMULLEN,
   V. JARVIS.